US009100532B2

(12) United States Patent
Narusawa et al.

(10) Patent No.: US 9,100,532 B2
(45) Date of Patent: Aug. 4, 2015

(54) IMAGE PROCESSING APPARATUS AND METHOD FOR GENERATING AN IMAGE

(75) Inventors: Ryu Narusawa, Kanagawa (JP); Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 13/159,067

(22) Filed: Jun. 13, 2011

(65) Prior Publication Data

US 2011/0317058 A1    Dec. 29, 2011

(30) Foreign Application Priority Data

Jun. 28, 2010   (JP) ................................. 2010-146667

(51) Int. Cl.
| | |
|---|---|
| H04N 9/083 | (2006.01) |
| H04N 3/14 | (2006.01) |
| H04N 5/335 | (2011.01) |
| H04N 9/04 | (2006.01) |
| H04N 5/228 | (2006.01) |
| H04N 9/73 | (2006.01) |

(52) U.S. Cl.
CPC ............... *H04N 9/045* (2013.01); *H04N 9/735* (2013.01)

(58) Field of Classification Search
CPC . H04N 9/045; H04N 2209/045; H04N 5/332; H04N 5/3458; H04N 2209/047; H04N 3/155; H04N 13/0025; H04N 13/025; H04N 13/0257; H01L 27/14621; H01L 27/14645; G01J 3/46
USPC ............................. 348/229.1, 222.1, 272–280
See application file for complete search history.

(56) References Cited

U.S. PATENT DOCUMENTS

| | | | | |
|---|---|---|---|---|
| 4,244,653 | A  * | 1/1981 | Asai et al. ..................... 356/404 |
| 4,943,834 | A  * | 7/1990 | Maeda et al. ................. 399/138 |
| 7,053,940 | B2 | 5/2006 | Hirai | |
| 7,468,746 | B2 * | 12/2008 | Sugimoto .................. 348/229.1 |
| 7,479,998 | B2 * | 1/2009 | Mitsunaga et al. ........... 348/273 |
| 7,656,442 | B2 * | 2/2010 | Tsuruoka ...................... 348/241 |
| 7,663,668 | B2 * | 2/2010 | Kuno et al. ................. 348/222.1 |
| 7,847,857 | B2 * | 12/2010 | Saito et al. .................... 348/364 |
| 7,940,431 | B2 * | 5/2011 | Hashizume ................... 358/446 |
| 2002/0041332 | A1* | 4/2002 | Murata et al. ................. 348/272 |
| 2003/0156214 | A1* | 8/2003 | Guimaraes et al. ........... 348/342 |
| 2005/0270526 | A1* | 12/2005 | Imura ........................... 356/328 |
| 2006/0082665 | A1* | 4/2006 | Mizukura et al. ............. 348/272 |
| 2007/0195181 | A1* | 8/2007 | Onomura ...................... 348/272 |

(Continued)

FOREIGN PATENT DOCUMENTS

JP       2002-232904       8/2002

*Primary Examiner* — Chia-Wei A Chen
(74) *Attorney, Agent, or Firm* — K&L Gates LLP (57) ABSTRACT

An image processing apparatus includes an output signal obtaining unit that is connected to a pixel group having a first pixel, a second pixel, and a third pixel and obtains a first output signal, a second output signal, and a third output signal, a spectral sensitivity determination unit that determines a first spectral sensitivity, a second spectral sensitivity, and a third spectral sensitivity, which are spectral sensitivities of the first, second, and third output signals, respectively, with respect to a wavelength of incident light entering the pixel group, an output signal amplification unit that amplifies the first, second, and third output signals based on the first, second, and third spectral sensitivities, respectively, and an image generation unit calculates pixel values of the first pixel, the second pixel, and the third pixel from the first output signal, the second output signal, and the third output signal amplified, and generates an image.

6 Claims, 6 Drawing Sheets

| Incident light wavelength [nm] | Spectral sensitivity [%] | | |
|---|---|---|---|
| | Red pixel | Blue pixel | Green pixel |
| 400 | 1 | 70 | 10 |
| 450 | 5 | 95 | 15 |
| 500 | 5 | 40 | 80 |
| 550 | 25 | 0 | 95 |
| 600 | 95 | 5 | 25 |
| 650 | 90 | 5 | 10 |

(56) References Cited

U.S. PATENT DOCUMENTS

| | | | |
|---|---|---|---|
| 2008/0278592 A1* | 11/2008 | Kuno et al. | 348/222.1 |
| 2009/0015689 A1* | 1/2009 | Murayama | 348/229.1 |
| 2009/0096907 A1* | 4/2009 | Oda | 348/321 |
| 2009/0213251 A1* | 8/2009 | Mizukura et al. | 348/278 |
| 2009/0219614 A1* | 9/2009 | Ryu et al. | 359/385 |
| 2010/0157116 A1* | 6/2010 | Kikuchi | 348/272 |
| 2010/0283866 A1* | 11/2010 | Numata | 348/223.1 |
| 2011/0058072 A1* | 3/2011 | Wang et al. | 348/242 |
| 2011/0228075 A1* | 9/2011 | Madden et al. | 348/81 |
| 2012/0069449 A1* | 3/2012 | Taniyama | 359/648 |

* cited by examiner

| Incident light wavelength [nm] | Spectral sensitivity [%] | | |
|---|---|---|---|
| | Red pixel | Blue pixel | Green pixel |
| 400 | 1 | 70 | 10 |
| 450 | 5 | 95 | 15 |
| 500 | 5 | 40 | 80 |
| 550 | 25 | 0 | 95 |
| 600 | 95 | 5 | 25 |
| 650 | 90 | 5 | 10 |

IMAGE PROCESSING APPARATUS AND METHOD FOR GENERATING AN IMAGE

CROSS REFERENCES TO RELATED APPLICATIONS

The present application claims priority to Japanese Priority Patent Application JP 2010-146667 filed in the Japanese Patent Office on Jun. 28, 2010, the entire content of which being incorporated herein by reference.

BACKGROUND

The present application relates to an image processing apparatus, an image processing method, and an image processing program for generating an image from an output signal of an image pickup element.

For an image pickup apparatus such as a digital camera, an image pickup element such as a CCD (charge coupled device) and a CMOS (complementary metal oxide semiconductor) is used. In such image pickup elements, a plurality of pixels are arranged in a planar form, and the pixels perform photoelectric conversion of light incident thereon (hereinafter, referred to as incident light) and output, as an electrical signal, the light that has been subjected to the photoelectric conversion. An arithmetic processing circuit performs arithmetic processing of the electrical signals, thereby generating an image.

Here, since the image pickup element as described above outputs an electrical signal in accordance with the intensity of light regardless of the wavelength of the incident light, it may be impossible to generate a color image by itself. In view of this, in an image pickup apparatus for generating a color image, color filters of colors which cause light having specific wavelength ranges (for example, RGB) to pass therethrough are provided to pixels, respectively (single panel system), and colors having wavelengths outside of the aforementioned wavelength ranges are attenuated by the color filters. With this structure, components of the incident light that have transmission wavelengths of the color filters reach the pixels and are converted into electrical signals.

There are various arrangements of the color filters of the respective colors. Generally, an arrangement called "Bayer arrangement" is employed. The Bayer arrangement refers to an arrangement that includes a column in which R and G are alternately disposed and a column in which B and G are alternately disposed so as not to set G to be adjacent to each other. Further, in the arrangement, the number of G, which has a high spectral sensitivity of a human eye, is set to twice the number of R and the number of B.

From the output signals of the pixels based on light that has passed through the color filters arranged as described above, the arithmetic processing circuit determines a pixel value (luminance value of each of RGB) of each of the pixels. At this time, because the pixels are provided with the color filters of the respective colors as described above, each of the luminance values calculated from the outputs corresponds to each transmission wavelength of the color filters, that is, relates to one of RGB. The arithmetic processing circuit calculates, from the outputs of adjacent image pickup elements, the luminance values of the other two colors by performing an "interpolation arithmetic", thereby determining pixel values of the respective pixels. The interpolation arithmetic method affects an image quality, so various method are being studied.

For example, Japanese Patent Application Laid-open No. 2002-232904 (paragraph 0038, FIG. 5) (hereinafter, referred to as Patent Document 1) discloses a technique relating to the interpolation arithmetic. An "signal processing apparatus" disclosed in Patent Document 1 judges whether vertical stripes or horizontal stripes are included in an image or not on the basis of a correlation of a horizontal direction and a vertical direction with respect to a pixel to be interpolated, and in accordance with the judgment result, selects pixel data used for the interpolation. Thus, even in the case where the vertical stripes or the horizontal stripes exist in the image, the blur of the image can be corrected appropriately

SUMMARY

Here, the interpolation arithmetic as described above is effective for the case where incident light is polychromatic light (light having a wide wavelength range) and enters each of image pickup elements corresponding to RGB uniformly. However, the interpolation arithmetic as described above is not effective for the case where incident light is monochromatic light (light having a narrow wavelength range). Examples of the case where incident light is monochromatic light include a photofluorography used in a pathological diagnosis, the case of taking an image of a fluorescently stained sample which is used for a DNA sequencer, and the like. In those cases, light enters a pixel to which a color filter that causes light of the corresponding color to pass therethrough is provided, but light hardly enters a pixel to which a color filter of another color is provided. From the pixel that light does not enter, information of a luminance value is not obtained, and a resolution is lowered as compared to the case where incident light is polychromatic light.

In view of the above-mentioned circumstances, it is desirable to provide an image processing apparatus, an image processing method, and an image processing program which are capable of preventing the resolution from being lowered even in the case where the incident light is the monochromatic light.

According to an embodiment, there is provided an image processing apparatus including an output signal obtaining unit, a spectral sensitivity determination unit, an output signal amplification unit, and an image generation unit.

The output signal obtaining unit is configured to be connected to a pixel group having a first pixel that performs photoelectric conversion of light passing through a first color filter having a first property and outputs the light that has been subjected to the photoelectric conversion as a first output signal, a second pixel that performs photoelectric conversion of light passing through a second color filter having a second property different from the first property and outputs the light that has been subjected to the photoelectric conversion as a second output signal, and a third pixel that performs photoelectric conversion of light passing through a third color filter having a third property different from the first property and the second property and outputs the light that has been subjected to the photoelectric conversion as a third output signal, and obtain the first output signal, the second output signal, and the third output signal.

The spectral sensitivity determination unit is configured to determine a first spectral sensitivity, a second spectral sensitivity, and a third spectral sensitivity. The first spectral sensitivity, the second spectral sensitivity, and the third spectral sensitivity are spectral sensitivities of the first output signal, the second output signal, and the third output signal, respectively, with respect to a wavelength of incident light that enters the pixel group.

The output signal amplification unit is configured to amplify the first output signal, the second output signal, and the third output signal based on the first spectral sensitivity, the second spectral sensitivity, and the third spectral sensitivity, respectively.

The image generation unit is configured to calculate pixel values of the first pixel, the second pixel, and the third pixel from the first output signal, the second output signal, and the third output signal, respectively, amplified by the output signal amplification unit, and generate an image.

In the case where monochromatic incident light enters a pixel group, the incident light is attenuated by at least one of the first color filter, the second color filter, and the third color filter, is subjected to photoelectric conversion, and is output as the first output signal, the second output signal, and the third output signal. Here, the spectral sensitivities of the respective pixels due to the attenuation of the incident light by the color filters, that is, the ratio of intensities of the output signals among the pixels is determined depending on the wavelength of the incident light. In the embodiment, the output signal amplification unit amplifies the first output signal, the second output signal, and the third output signal on the basis of the first spectral sensitivity, the second spectral sensitivity, and the third spectral sensitivity, respectively. As a result, when generating the image from the output signals which have been amplified, the image generation unit can use the output signal from the pixel, the output signal of which is small and from which information is difficult to obtain originally, and the resolution can be maintained at the same level as the case where polychromatic light enters the pixel group.

The image processing apparatus may further include an incident light wavelength obtaining unit configured to obtain the wavelength of the incident light, and the spectral sensitivity determination unit may be configured to have a spectral sensitivity table in which a correlation between the wavelength of incident light and the first spectral sensitivity, the second spectral sensitivity, and the third spectral sensitivity is registered in advance, and select the first spectral sensitivity, the second spectral sensitivity, and the third spectral sensitivity corresponding to the wavelength of incident light obtained by the incident light wavelength obtaining unit.

According to the embodiment, the spectral sensitivity determination unit holds in advance the spectral sensitivity table relating to those color filters, and selects the first spectral sensitivity, the second spectral sensitivity, and the third spectral sensitivity corresponding to the wavelength of incident light. As a result, the image processing apparatus can maintain the resolutions of the monochromatic light of a plurality of colors listed in the spectral sensitivity table.

The output signal amplification unit may be configured to amplify the first output signal, the second output signal, and the third output signal at amplification rates, the amplification rates being reciprocals of the first spectral sensitivity, the second spectral sensitivity, and the third spectral sensitivity, respectively.

With this structure, the image processing apparatus can amplify the first output signal, the second output signal, and the third output signal at the same level as the case where the color filters are not respectively provided to the pixels and can maintain the resolutions.

The image generation unit may be configured to set intensities of the first output signal, the second output signal, and the third output signal to be a luminance value of a color having the wavelength of the incident light obtained by the incident light wavelength obtaining unit.

With this structure, the image generation unit can determine the pixel values of the respective pixels from the luminance values thereof and can generate image.

According to another embodiment, there is provided an image processing method includes obtaining a first output signal, a second output signal, and a third output signal by an output signal obtaining unit connected to a pixel group having a first pixel that performs photoelectric conversion of light passing through a first color filter having a first property and outputs the light that has been subjected to the photoelectric conversion as the first output signal, a second pixel that performs photoelectric conversion of light passing through a second color filter having a second property different from the first property and outputs the light that has been subjected to the photoelectric conversion as the second output signal, and a third pixel that performs photoelectric conversion of light passing through a third color filter having a third property different from the first property and the second property and outputs the light that has been subjected to the photoelectric conversion as the third output signal.

A spectral sensitivity determination unit determines a first spectral sensitivity, a second spectral sensitivity, and a third spectral sensitivity. The first spectral sensitivity, the second spectral sensitivity, and the third spectral sensitivity are spectral sensitivities of the first output signal, the second output signal, and the third output signal, respectively, with respect to a wavelength of incident light that enters the pixel group.

An output signal amplification unit amplifies the first output signal, the second output signal, and the third output signal based on the first spectral sensitivity, the second spectral sensitivity, and the third spectral sensitivity, respectively.

An image generation unit calculates pixel values of the first pixel, the second pixel, and the third pixel from the first output signal, the second output signal, and the third output signal, respectively, amplified by the output signal amplification unit and generates an image.

According to another embodiment, there is provided an image processing program configured to cause a computer to function as an output signal obtaining unit, a spectral sensitivity determination unit, an output signal amplification unit, and an image generation unit.

The output signal obtaining unit is configured to be connected to a pixel group having a first pixel that performs photoelectric conversion of light passing through a first color filter having a first property and outputs the light that has been subjected to the photoelectric conversion as a first output signal, a second pixel that performs photoelectric conversion of light passing through a second color filter having a second property different from the first property and outputs the light that has been subjected to the photoelectric conversion as a second output signal, and a third pixel that performs photoelectric conversion of light passing through a third color filter having a third property different from the first property and the second property and outputs the light that has been subjected to the photoelectric conversion as a third output signal, and obtain the first output signal, the second output signal, and the third output signal.

The spectral sensitivity determination unit is configured to determine a first spectral sensitivity, a second spectral sensitivity, and a third spectral sensitivity. The first spectral sensitivity, the second spectral sensitivity, and the third spectral sensitivity are spectral sensitivities of the first output signal, the second output signal, and the third output signal, respectively, with respect to a wavelength of incident light that enters the pixel group.

The output signal amplification unit is configured to amplify the first output signal, the second output signal, and the third output signal based on the first spectral sensitivity, the second spectral sensitivity, and the third spectral sensitivity, respectively.

The image generation unit is configured to calculate pixel values of the first pixel, the second pixel, and the third pixel from the first output signal, the second output signal, and the third output signal, respectively, amplified by the output signal amplification unit, and generate an image.

According to the embodiments of the present application, it is possible to provide the image processing apparatus, the image processing method, and the image processing program which are capable of preventing the reduction in resolution even in the case where the incident light is monochromatic light.

Additional features and advantages are described herein, and will be apparent from the following Detailed Description and the figures.

DETAILED DESCRIPTION

Embodiments of the present application will be described below in detail with reference to the drawings.

Hereinafter, an embodiment will be described with reference to the drawings.

Structure of Image Processing Apparatus

Figure 1:
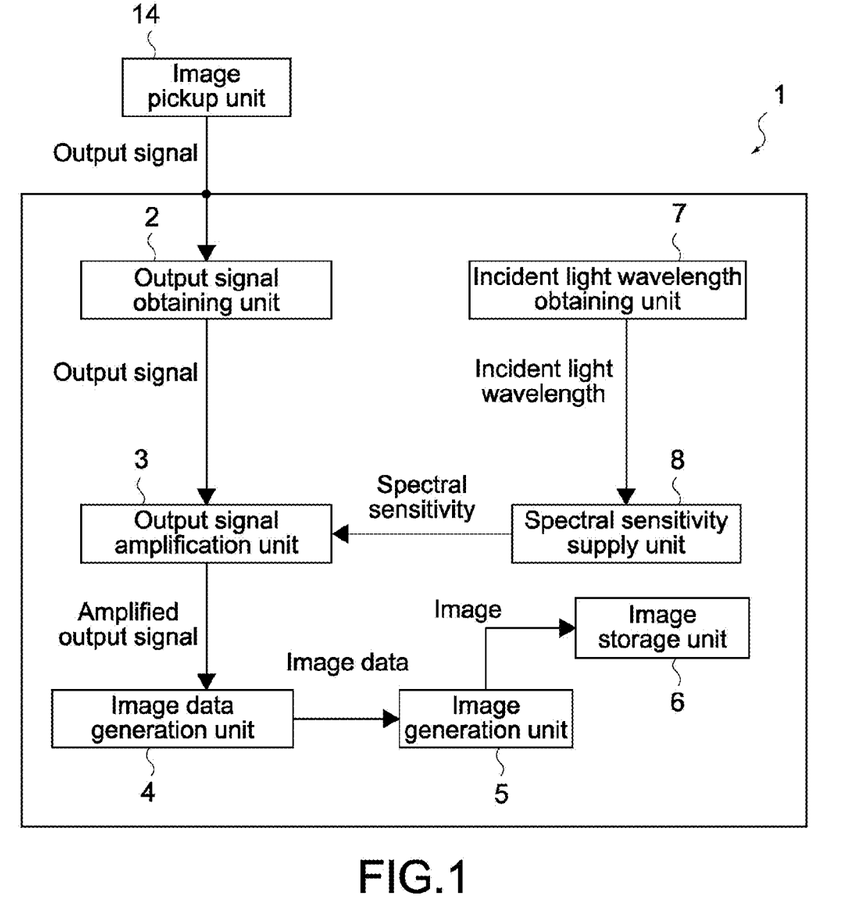
FIG. 1 is a block diagram showing the structure of an image processing apparatus according to the embodiment.

FIG. 1 is a block diagram showing the structure of an image processing apparatus 1 according to the embodiment. As shown in the figure, the image processing apparatus 1 includes an output signal obtaining unit 2, an output signal amplification unit 3, an image data generation unit 4, an image generation unit 5, an image storage unit 6, an incident light wavelength obtaining unit 7, and a spectral sensitivity supply unit 8. The output signal obtaining unit 2 is connected to the output signal amplification unit 3, and the output signal amplification unit 3 is connected to the image data generation unit 4. The image data generation unit 4 is connected to the image generation unit 5, and the image generation unit 5 is connected to the image storage unit 6. Further, the incident light wavelength obtaining unit 7 is connected to the spectral sensitivity supply 8, and the spectral sensitivity supply 8 is connected to the output signal amplification unit 3. To the output signal obtaining unit 2, an image pickup unit 14 is connected.

The output signal obtaining unit 2 obtains an "output signal" which is output from the image pickup unit 14 connected thereto and outputs the signal to the output signal amplification unit 3. Here, the image pickup unit 14 will be described.

Figure 2:
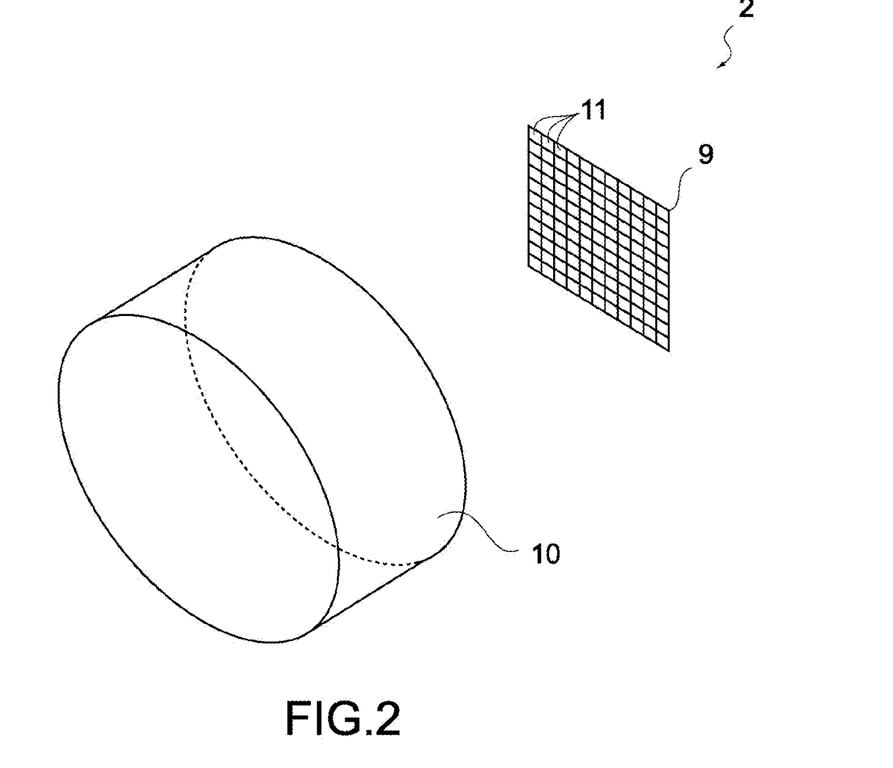
FIG. 2 is a schematic diagram showing an image pickup unit according to the embodiment.

The image pickup unit 14 generates an output signal from incident light. FIG. 2 is a schematic diagram showing the image pickup unit 14. As shown in the figure, the image pickup unit 14 has a pixel group 9 and an optical system 10 and has the structure in which light collected by the optical system 10 enters the pixel group 9. The pixel group 9 is formed by arranging a plurality of pixels 11. In actuality, the number of pixels 11 is larger than that shown in the figure (for example, several million).

Figure 3:
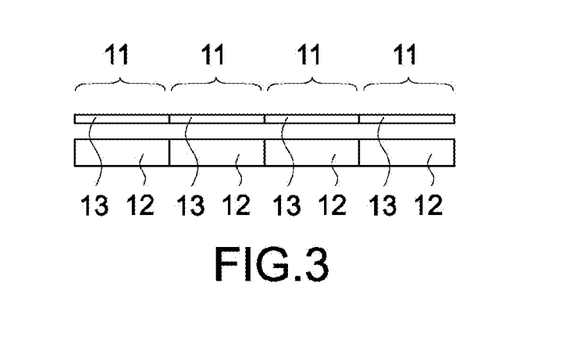
FIG. 3 is a cross-sectional diagram of pixels according to the embodiment.

FIG. 3 is a cross-sectional diagram showing the plurality of pixels. As shown in the figure, each of the plurality of pixels 11 has a photoelectric conversion element 12 and a color filter 13. The color filter 13 is disposed on the side of the optical system 10. The photoelectric conversion element 12 is an element capable of performing the photoelectric conversion, such as a CCD (charge coupled device) and a CMOS (charge coupled device), and the detailed structure thereof will be omitted. The color filter 13 is a filter that attenuates light having a wavelength other than a specific wavelength (hereinafter, referred to as transmission wavelength), and there are three kinds of color filters having different transmission properties.

Figure 4:
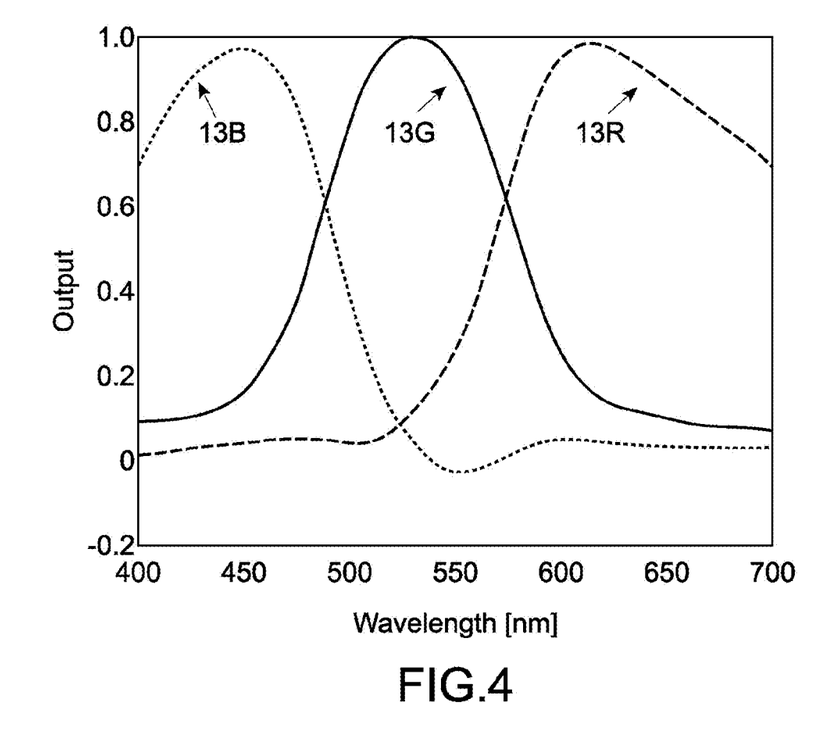
FIG. 4 is a graph showing transmission wavelengths of three kinds of color filters according to the embodiment.

FIG. 4 is a graph showing the transmission properties of the three kinds of color filters 13. The lateral axis of the graph indicates the wavelength of light, and the vertical axis indicates the output of the photoelectric conversion elements 12 by light that passes through the color filters 13. As shown in the figure, the transmission properties of the three kinds of the color filters 13 have waveforms, the centers of which are 450 nm, 530 nm, and 620 nm, respectively. Hereinafter, the color filter 13 having the center transmission wavelength of about 450 nm (blue color region) is set as a blue filter 13B, the color filter 13 having the center transmission wavelength of about 530 nm (green color region) is set as a green filter 13G, and the color filter 13 having the center transmission wavelength of about 620 nm (red color region) is set as a red filter 13R. It should be noted that the transmission properties of the color filters 13 are not limited to those shown in the specification, and the kinds of the color filters 13 are not limited to three but may be four, for example.

Figure 5:
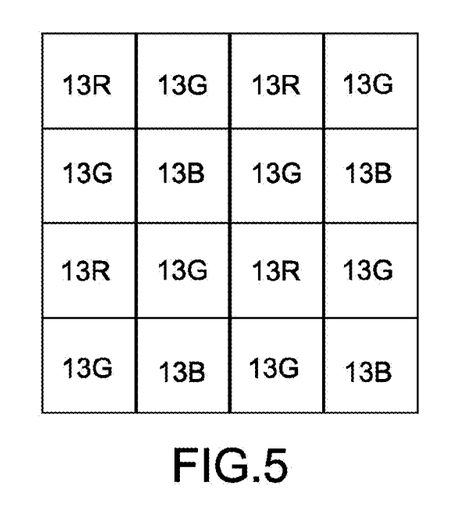
FIG. 5 is a schematic diagram showing an arrangement example of red color filters, green color filters, and blue color filters according to the embodiment.

FIG. 5 is a schematic diagram showing the arrangement of the red filters 13R, the green filters 13G, and the blue filters 13B. As shown in the figure, in the color filters, the columns in which the red filters 13R and the green filters 13G are alternately disposed and the columns in which the blue filters 13B and the green filters 13G are alternately disposed are arranged so that the green filters 13G are not adjacent to each other. Because the green color is high in spectral sensitivity of a human eye, the number of green filters 13G is set to twice the number of red filters 13R and the number of blue filters 13B. The arrangement is called the "Bayer arrangement". However, the arrangement of the color filters 13 is not limited to the Bayer arrangement.

In the pixels 11 structured as described above, light that is incident thereon through the optical system 10 is dispersed by the color filters 13, and light having the transmission wavelengths of the respective color filters 13 enters the photoelectric conversion element 12. The photoelectric conversion element 12 performs the photoelectric conversion of the incident light and outputs the light as an output signal. At this time, the output signals vary depending on the intensities of the incident light on the photoelectric conversion element 12. In this way, the output signals of the respective pixels 11 are output from the image pickup unit 14 to the output signal obtaining unit 2. It should be noted that the pixel 11 to which the red filter 13R is provided is referred to as a "red pixel", the pixel 11 to which the green filter 13G is provided is referred to as a "green pixel", and the pixel 11 to which the blue filter 13B is provided is referred to as a "blue pixel", hereinafter.

The output signal amplification unit 3 amplifies the output signals of the pixels 11 in accordance with the "spectral sensitivity" which is input from the spectral sensitivity supply unit 8. Although the details will be described later, the output signal amplification unit 3 amplifies the output signals of the respective pixels 11 at amplification rates which are calculated on the basis of the spectral sensitivities for each of the red pixel, the green pixel, and the blue pixel. The output signal amplification unit 3 can amplify the output signals in terms of software or hardware. The output signal amplification unit 3 outputs the output signals of the pixels 11 amplified to the image data generation unit 4.

The image data generation unit 4 generates "image data" from the output signals of the pixels 11 that have been amplified. The image data generation unit 4 calculates the pixel values (luminance values of RGB) by using the output signals of the corresponding pixels 11. It should be noted that in this embodiment, it is assumed that the incident light is monochromatic light, so the pixel value is used for the same meaning as the luminance value. The image data generation unit 4 may additionally perform noise reduction processing, contrast emphasis processing, or the like. The image data generation unit 4 outputs the calculated pixel values for each pixel 11 to the image generation unit 5 as the "image data".

The image generation unit 5 generates an image in an arbitrary image format, such as the JPEG (joint photographic experts group), from the image data, and outputs the image to the image storage unit 6. The image storage unit 6 stores the image in a nonvolatile memory or the like or transmits the image to outside.

The incident light wavelength obtaining unit 7 obtains an "incident light wavelength" that is the wavelength of light that enters the image pickup unit 14. The incident light wavelength obtaining unit 7 may obtain the incident light wavelength from an input by the user or by measurement with the use of a spectrometer or the like. Alternatively, the incident light wavelength obtaining unit 7 may obtain the incident light wavelength from barcode information which is indicated on a preparation or the like. The incident light wavelength obtaining unit 7 outputs the incident light wavelength to the spectral sensitivity supply unit 8.

Figure 6:
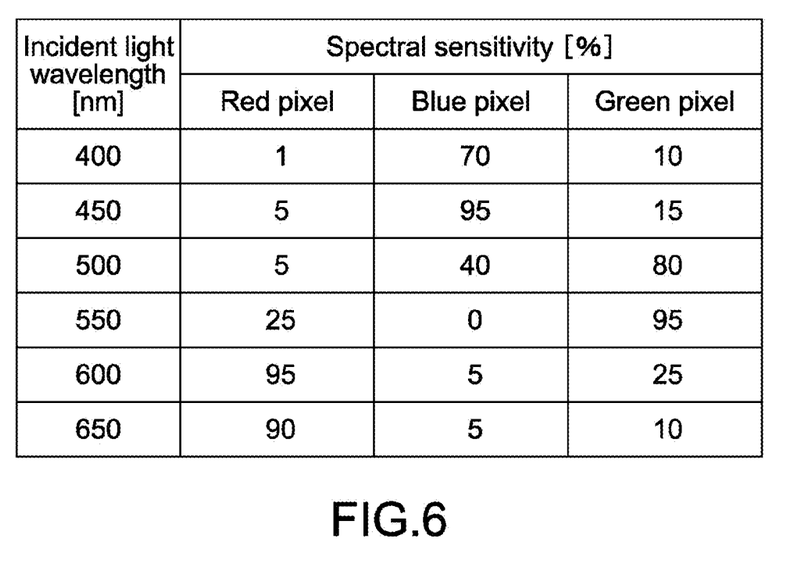
FIG. 6 is a table showing an example of a spectral sensitivity table according to the embodiment.

The spectral sensitivity supply unit 8 supplies the "spectral sensitivities" of the pixels of the respective colors in accordance with the incident light wavelengths to the output signal amplification unit 3. Specifically, the spectral sensitivity supply unit 8 stores a "spectral sensitivity table" in which the spectral sensitivities are indicated for each wavelength. FIG. 6 is a table showing an example of the spectral sensitivity table. The spectral sensitivity table shows output ratios of the red pixels, the green pixels, and the blue pixels in the case where the light having specific wavelengths enters the image pickup unit 14, and the ratios can be obtained from the outputs of the pixels with respect to the wavelengths as shown in FIG. 4. When the incident light wavelength is supplied from the incident light wavelength obtaining unit 7, the spectral sensitivity supply unit 8 selects the spectral sensitivity of the pixel of the corresponding color from the spectral sensitivity table and supplies the spectral sensitivity to the output signal amplification unit 3.

The image processing apparatus 1 according to this embodiment is configured as described above.

Operation of Image Processing Apparatus

The operation of the image processing apparatus 1 will be described.

The assumption is made that an image pickup target object that has a monochromatic tone of a sample or the like which is fluorescently stained for the photofluorography or a DNA (deoxyribonucleic acid) sequencer, that is, emits monochromatic light is set to the image pickup unit 14.

Figure 7:
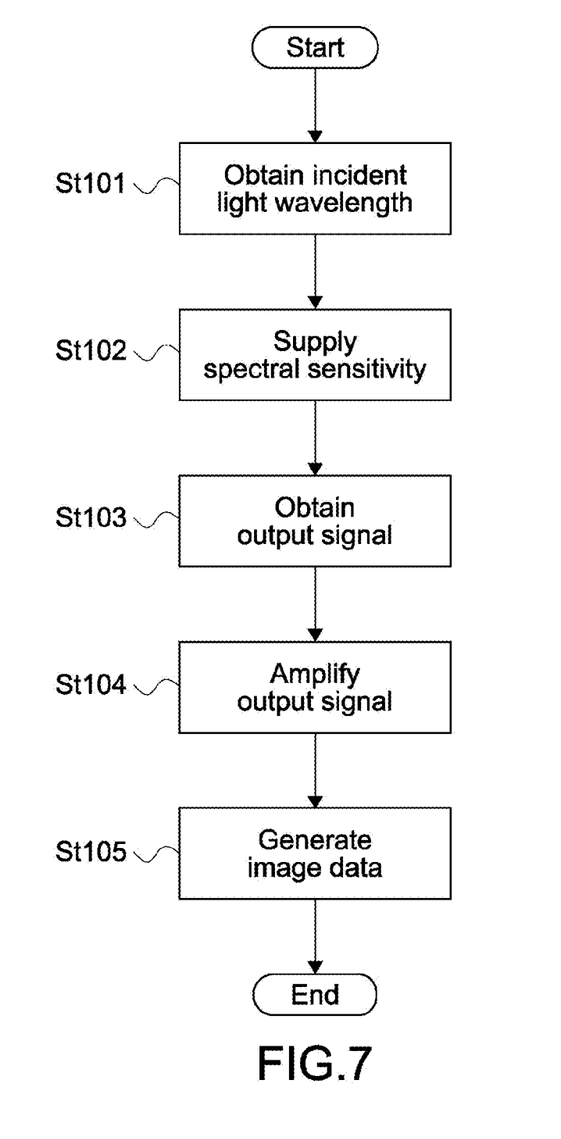
FIG. 7 is a flowchart showing the operation of the image processing apparatus according to the embodiment.

FIG. 7 is a flowchart showing the operation of the image processing apparatus 1.

Steps (St) shown in the figure will be described in order.

First, the incident light wavelength obtaining unit 7 obtains an "incident light wavelength" (St101). As described above, the incident light wavelength obtaining unit 7 can obtain the incident light wavelength from the input by the user or from the measurement by using the spectrometer. The incident light wavelength obtaining unit 7 outputs the obtained incident light wavelength to the spectral sensitivity supply unit 8.

The spectral sensitivity supply unit 8 refers to the spectral sensitivity table, selects the spectral sensitivities of the pixels of the respective colors having the wavelength corresponding to the incident light wavelength, and supplies the selected spectral sensitivities to the output signal amplification unit 3 (St102). For example, in the case where the incident light wavelength which is output from the incident light wavelength obtaining unit 7 is 600 nm, the spectral sensitivities of red, blue, and green are 95%, 5%, and 25%, respectively.

Next, the output signal obtaining unit 2 obtains a first output signal, a second output signal, and a third output signal (St103). Specifically, the incident light that has reached the pixel group 9 through the optical system 10 in the image pickup unit 14 passes through the color filters 13 of the respective colors provided to the pixels 11 and reaches the photoelectric conversion elements 12. At this time, because the red color filter 13R, the green color filter 13G, and the blue color filter 13B respectively have the predetermined transmission wavelengths as described above, out of the incident light, components which are not included in the transmission wavelengths are attenuated by the color filters 13. Light that is not attenuated is subjected to the photoelectric conversion in the photoelectric conversion element 12 and is output as the first output signal, the second output signal, and the third output signal. The output signal obtaining unit 2 obtains those output signals.

Subsequently, the output signal amplification unit 3 amplifies the output signals (St104). At this time, the output signal amplification unit 3 uses the spectral sensitivities of the pixels of the respective colors supplied from the spectral sensitivity supply unit 8 to determine the amplification rate. Specifically, the output signal amplification unit 3 determines an amplification rate $\alpha$ of the output signals of the pixels of the respective colors by using the following expression 1.

$$\alpha = 10000/n \quad \text{(Expression 1)}$$

where n represents the spectral sensitivity corresponding to a pixel to be amplified.

For example, as the example described above, in the case where the spectral sensitivities of the red, blue, and green pixels are 95%, 5%, and 25%, respectively, the amplification rate $\alpha$ is determined to be 10000/95(%)=105.2(%) in the case of the red pixel. Similarly, in the case of the blue pixel, the amplification rate $\alpha$ is determined to be 10000/5(%)=2000 (%), and in the case of the green pixel, the amplification rate $\alpha$ is determined to be 10000/25(%)=400(%).

The output signal amplification unit 3 multiplies the amplification rate $\alpha$ of each of the colors calculated as described above in accordance with the color of the pixel 11 to be amplified, thereby amplifying the output signals. As a result, the output signals of the respective pixels 11 are subjected to the amplification corresponding to the attenuation by the color filters 13. Further, the output signal amplification unit 3 may adjust the amplification rate α for the purpose of a white balance or the like. The output signal amplification unit 3 outputs the output signals of the pixels 11 amplified to the image data generation unit 4.

Next, the image data generation unit 4 generates image data from the output signals of the pixels 11 amplified (St105). Specifically, the image data generation unit 4 discretize the intensity of the output signals of the pixels 11, to obtain the luminance values. At this time, the image data generation unit 4 sets the luminance value as the luminance value of the color of the incident light wavelength obtained by the incident light wavelength obtaining unit 7 irrespective of the color pixels (red, green, or blue pixels) from which the output signals are output. In other words, the pixels 11 corresponding to the respective colors are treated as the pixels 11 corresponding to the color of the incident light wavelength.

For example, in the case where the incident light wavelength is 600 nm (red color region), and the luminance value obtained from the output signal of a blue pixel is 100, the image data generation unit 4 treats the pixel as not a blue pixel but a pixel having the luminance value of 100 at the wavelength of 600 nm (red). In this way, the image data generation unit 4 determines, for all the pixels 11, the luminance values of the colors having the incident light wavelength.

Further, the image data generation unit 4 obtains the pixel values of the pixels 11 from the luminance values of the pixels 11. In the case where the incident light wavelength coincides with or comes close to the wavelength of any one of the respective primary colors, the luminance value can be set as the pixel value of the primary color. For example, in the case where the incident light wavelength is 600 nm, and the luminance value is 100, the wavelength of 600 nm is a wavelength of the primary color R, and therefore the pixel values can be set to R:G:B=100:0:0. On the other hand, in the case where the incident light wavelength does not come close to the wavelength of any one of the primary colors of RGB, the luminance value may be converted into the pixel value. For example, in the case where the incident light wavelength is 580 nm, and the luminance value is 100, the wavelength of 580 nm is intermediate wavelength between the primary color R and the primary color G, and therefore the pixel values can be set to R:G:B=50:50:0. Thus, the image data generation unit 4 can calculate the pixel values of all the pixels 11. The image data generation unit 4 generates the image data by associating the generated pixel values of the pixels 11 with coordinates thereof and outputs the image data to the image generation unit 5.

Hereinafter, when necessary, the image generation unit 5 generates an image with a predetermined image format from the image data and outputs the image to the image storage unit 6. The image storage unit 6 stores the image or transmits to outside.

In the way as described above, the image processing apparatus 1 takes an image of the image pickup target object.

Effect Produced by this Embodiment

A description will be given on an effect of the image processing apparatus 1 according to this embodiment.

Figure 8:
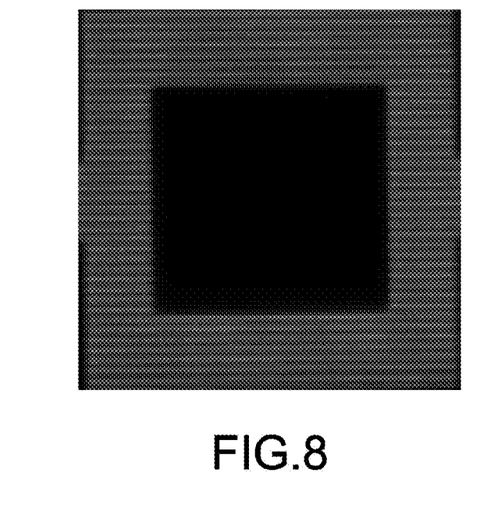
FIG. 8 is a sample image generated by an image processing apparatus of a comparative example.
Figure 9:
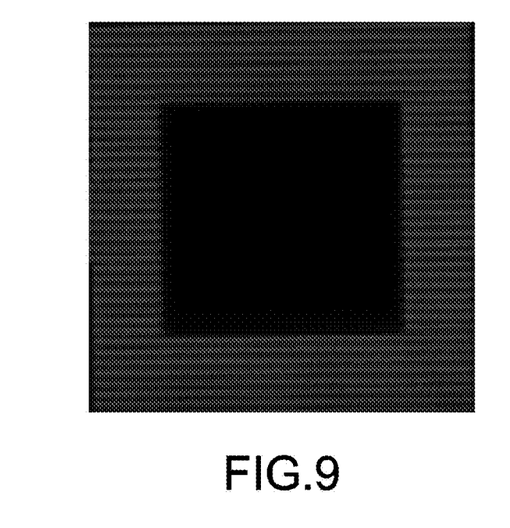
FIG. 9 is a sample image generated by the image processing apparatus according to the embodiment.

FIG. 8 is a diagram showing a sample image generated by an image processing apparatus of a comparative example, and FIG. 9 is a diagram showing a sample image generated by the image processing apparatus 1 according to this embodiment. The sample images of FIGS. 8 and 9 are obtained by taking an image pickup target object having the same monochromatic tone under the same condition. However, in the comparative example shown in FIG. 8, the structure corresponding to the output signal amplification unit 3 of the image processing apparatus 1 according to this embodiment is not provided, that is, image data is generated without amplifying the outputs of respective pixels. It should be noted that the incident light wavelength of the sample shown in FIGS. 8 and 9 is set to 600 nm (red color region).

Comparing FIG. 8 with FIG. 9, it is found that the sample image shown in FIG. 9 according to this embodiment is clearer in terms of a linear structure and have higher resolution than the sample image shown in FIG. 8 in the comparative example. This is because output signals of green pixels and blue pixels are small, and information of those pixels are not effectively used in the comparative example, while in this embodiment, the output signals of those pixels are also amplified and effectively used to determine the pixel values. Thus, in this embodiment, the output signal of a pixel corresponding to a wavelength different from the incident light wavelength can be effectively used by being amplified in accordance with the incident light wavelength, and the resolution of an image to be generated can be increased.

The present application is not limited to the above embodiment, and can be variously modified without departing from the gist of the present application.

In the above embodiment, the wavelength range of the color filters to be amplified by the output signal amplification unit is a visible light range but is not limited to this. For example, the wavelength range can be set to an ultraviolet range or an infrared range.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An image processing apparatus, comprising:
   an output signal obtaining unit configured to be connected to a pixel group having a first pixel that performs photoelectric conversion of light passing through a first color filter having a first property and outputs the light that has been subjected to the photoelectric conversion as a first output signal, a second pixel that performs photoelectric conversion of light passing through a second color filter having a second property different from the first property and outputs the light that has been subjected to the photoelectric conversion as a second output signal, and a third pixel that performs photoelectric conversion of light passing through a third color filter having a third property different from the first property and the second property and outputs the light that has been subjected to the photoelectric conversion as a third output signal, and obtain the first output signal, the second output signal, and the third output signal;
   a spectral sensitivity determination unit configured to determine a first spectral sensitivity, a second spectral sensitivity, and a third spectral sensitivity, the first spectral sensitivity, the second spectral sensitivity, and the third spectral sensitivity being spectral sensitivities of the first output signal, the second output signal, and the third output signal, respectively, with respect to a wavelength of incident monochromatic light that enters the pixel group, wherein the monochromatic light includes only one color;
   an output signal amplification unit configured to determine an amplification rate of the first, second, and third output signals using the first, second, and third spectral sensitivities, which are input from the spectral sensitivity determination unit, respectively, and further configured to amplify the first, second, and third output signals at each amplification rate determined; and an image data generation unit configured to generate image data from the first, second, and third output signals amplified by the output signal amplification unit.

2. The image processing apparatus according to claim 1, further comprising an incident light wavelength obtaining unit configured to obtain the wavelength of the incident monochromatic light, wherein the spectral sensitivity determination unit is configured to have a spectral sensitivity table in which a correlation between the wavelength of incident monochromatic light and the first spectral sensitivity, the second spectral sensitivity, and the third spectral sensitivity is registered in advance, and select the first spectral sensitivity, the second spectral sensitivity, and the third spectral sensitivity corresponding to the wavelength of incident monochromatic light obtained by the incident light wavelength obtaining unit.

3. The image processing apparatus according to claim 2, wherein the output signal amplification unit is configured to amplify the first output signal, the second output signal, and the third output signal at amplification rates, the amplification rates being reciprocals of the first spectral sensitivity, the second spectral sensitivity, and the third spectral sensitivity, respectively.

4. The image processing apparatus according to claim 3, wherein the image data generation unit is configured to set intensities of the first output signal, the second output signal, and the third output signal to be a luminance value of a color having the wavelength of the incident monochromatic light obtained by the incident light wavelength obtaining unit.

5. An image processing method, comprising:

obtaining a first output signal, a second output signal, and a third output signal by an output signal obtaining unit connected to a pixel group having a first pixel that performs photoelectric conversion of light passing through a first color filter having a first property and outputs the light that has been subjected to the photoelectric conversion as the first output signal, a second pixel that performs photoelectric conversion of light passing through a second color filter having a second property different from the first property and outputs the light that has been subjected to the photoelectric conversion as the second output signal, and a third pixel that performs photoelectric conversion of light passing through a third color filter having a third property different from the first property and the second property and outputs the light that has been subjected to the photoelectric conversion as the third output signal;

determining a first spectral sensitivity, a second spectral sensitivity, and a third spectral sensitivity by a spectral sensitivity determination unit, the first spectral sensitivity, the second spectral sensitivity, and the third spectral sensitivity being spectral sensitivities of the first output signal, the second output signal, and the third output signal, respectively, with respect to a wavelength of incident monochromatic light that enters the pixel group, wherein the monochromatic light includes only one color;

amplifying the first output signal, the second output signal, and the third output signal at amplification rates which are calculated using the first spectral sensitivity, the second spectral sensitivity, and the third spectral sensitivity which are input from the spectral sensitivity determination unit, respectively, by an output signal amplification unit, wherein each of the spectral sensitivities is provided by the spectral sensitivity determination unit; and generating image data from the first, second, and third output signals amplified by the output signal amplification unit.

6. An image processing apparatus having a program configured to cause a computer to function as an output signal obtaining unit configured to be connected to a pixel group having a first pixel that performs photoelectric conversion of light passing through a first color filter having a first property and outputs the light that has been subjected to the photoelectric conversion as a first output signal, a second pixel that performs photoelectric conversion of light passing through a second color filter having a second property different from the first property and outputs the light that has been subjected to the photoelectric conversion as a second output signal, and a third pixel that performs photoelectric conversion of light passing through a third color filter having a third property different from the first property and the second property and outputs the light that has been subjected to the photoelectric conversion as a third output signal, and obtain the first output signal, the second output signal, and the third output signal, a spectral sensitivity determination unit configured to determine a first spectral sensitivity, a second spectral sensitivity, and a third spectral sensitivity, the first spectral sensitivity, the second spectral sensitivity, and the third spectral sensitivity being spectral sensitivities of the first output signal, the second output signal, and the third output signal, respectively, with respect to a wavelength of incident monochromatic light that enters the pixel group, wherein the monochromatic light includes only one color, an output signal amplification unit configured to determine an amplification rate of the first, second, and third output signals using the first, second, and third spectral sensitivities which are input from the spectral sensitivity determination unit, respectively, and further configured to amplify the first, second, and third output signals at each amplification rate determined, wherein the spectral sensitivity determination unit supplies the first, second, and third spectral sensitivities to the output signal amplification unit; and an image data generation unit configured to generate image data from the first, second, and third output signals amplified by the output signal amplification unit.

* * * * *